United States Patent [19]

Zagranski et al.

[11] 4,423,593

[45] Jan. 3, 1984

[54] FUEL CONTROL FOR CONTROLLING HELICOPTER ROTOR/TURBINE ACCELERATION

[75] Inventors: Raymond D. Zagranski, Somers; James J. Howlett, North Haven, both of Conn.

[73] Assignee: Chandler Evans Inc., West Hartford, Conn.

[21] Appl. No.: 369,301

[22] Filed: Apr. 16, 1982

[51] Int. Cl.$^3$ ............................................. F02C 9/28
[52] U.S. Cl. ............................. 60/39.161; 60/39.281
[58] Field of Search ................ 60/39.161, 39.281, 243

[56] References Cited

U.S. PATENT DOCUMENTS

| | | | |
|---|---|---|---|
| 2,971,338 | 2/1961 | Bodemoller | 60/39.281 |
| 3,638,422 | 2/1972 | Loft et al. | 60/39.281 |
| 4,045,955 | 9/1977 | Goran | 60/39.281 |
| 4,217,754 | 8/1980 | Schmidt-Roedenbeck | 60/39.281 |
| 4,344,141 | 8/1982 | Yates | 60/39.281 |

Primary Examiner—Louis J. Casaregola
Attorney, Agent, or Firm—M. P. Williams

[57] ABSTRACT

The difference in the speed (54, 56) of a helicopter gas engine (20), free turbine (40) from a reference speed (62, 64) generates (80) a desired acceleration signal (81). The difference (82) in actual turbine acceleration (84, 86) from desired acceleration is integrated (100) to provide an engine fuel command signal (67-73) whenever (88) the speed error signal exceeds (90) a predetermined threshold magnitude.

2 Claims, 1 Drawing Figure

FUEL CONTROL FOR CONTROLLING HELICOPTER ROTOR/TURBINE ACCELERATION

The Government has rights in this invention pursuant to Contract No. DAAK51-80-C-0038 awarded by the Department of the Army.

TECHNICAL FIELD

This invention relates to fuel controls, and more particularly to a fuel control which avoids speed and torque overshoots by controlling the acceleration of the engine free turbine and/or the helicopter rotor.

BACKGROUND ART

In modern helicopters, the trend toward main rotor systems which have lower inertia reduces the level of stored energy in the rotor system and causes the rotor to be more susceptible to large transient speed excursions during some flight maneuvers. Such main rotor speed excursions, working in conjunction with other flight characteristics of helicopters, upset the attitude trim of the aircraft as well as causing undesirable lag in attaining altitude or speed. The undesirable perturbation of attitude trim either causes an increase in pilot workload (frequently at critical times) or saturates the aircraft stability augmentation system, or both.

An example of an undesirable speed excursion is at the conclusion of an autorotative maneuver, such as a quick turn or an autorotative descent. During autorotation, the aircraft kinetic energy is transferred into rotor torque which causes the rotor to speed up and declutch from the rotor driving means (the engine). With the rotor decoupled from the engine, the engine needs to supply only sufficient torque to drive any auxilliary equipment which is attached thereto on the engine side of the clutch. Thus the engine is able to maintain rated speed with next to no torque. In the case of a free turbine gas engine, the free turbine speed governor is easily satisfied with the gas generator (turbocompressor) portion of the engine essentially at idle. During the recovery from the autorotative maneuver, the rotor slows down until its speed equals that of the engine, at which point it reengages to the engine through the overruning clutch. As soon as the rotor reengages with the engine, the torque requirements thereof cause the free turbine and rotor speed to droop significantly. Because the gas generator is at idle just before reengagement of the rotor to the engine, it is unable to supply sufficient torque to the free turbine to prevent the speed droop. The drastic change in free turbine speed causes the engine fuel control to attempt to recover the speed rapidly, thereby resulting in generation of a very high torque. But as the free turbine reaches rated speed, the excessive torque of the gas generator causes an overspeed and over-torque situation. This provides undesirable perturbations in the opposite direction from the initial speed droop.

As is known, many attempts (including the use of derivative, proportional and integral controls) have been made to cause sophisticated control algorithms to impart the necessary high rate of fuel flow required to recover from a speed droop, while at the same time not overshooting. In the end, speed and torque overshoots are accepted as being an uncomfortable annoyance in contrast with severe speed droop and slow recovery therefrom, which can be outright dangerous. These effects are particularly harsh in the helicopter since the speed and torque variations in the main rotor upset attitude trim in a variety of ways. Thus, although severe droop and slow recovery therefrom cannot be tolerated in the helicopter, trim perturbations are not only caused during the speed droop, but also as a consequence of the overshoot which results from trying to overcome the speed droop. And, fuel controls known to the prior art are incapable of overcoming droop without overshoot over a wide range of flight maneuvers.

DISCLOSURE OF INVENTION

Objects of the invention include provision of a helicopter engine control which minimizes torque or speed overshoot while quickly overcoming underspeed or overspeed conditions of the free turbine (and therefore the helicopter main rotor).

According to the present invention, the fuel flow to the gas generator of a free turbine gas engine in a helicopter is manipulated to control the acceleration of the engine free turbine (and therefore the helicopter rotors, when engaged therewith). According to the invention, the variation in free turbine speed from desired speed generates a desired turbine acceleration command which is compared with actual turbine acceleration, the deviation in which is integrated to provide a gas generator speed command for use in metering fuel flow to the engine.

The invention, by utilizing free turbine acceleration (rather than speed) as the controlling parameter for engine fuel flow automatically provides asymtotic approach to desired speed when recovering from any speed variations, thus assuring the absence of any overshoot in all cases within the limits on the engine control.

The invention may be implemented in a variety of fashions including analog, digital or computer controls, in a simple fashion, or with additional features incorporated therewith to provide a more sophisticated control. The invention is easily implemented utilizing apparatus and techniques which are well within the skill of the art, in the light of the specific teachings with respect thereto which follow hereinafter.

Other objects, features and advantages of the present invention will become more apparent in the light of the following detailed description of exemplary embodiments thereof, as illustrated in the accompanying drawing.

BRIEF DESCRIPTION OF DRAWING

The sole FIGURE herein is a simplified schematic block diagram of a helicopter rotor drive system in which the engine fuel controls free turbine/rotor acceleration according to the invention.

BEST MODE FOR CARRYING OUT THE INVENTION

Figure 1:
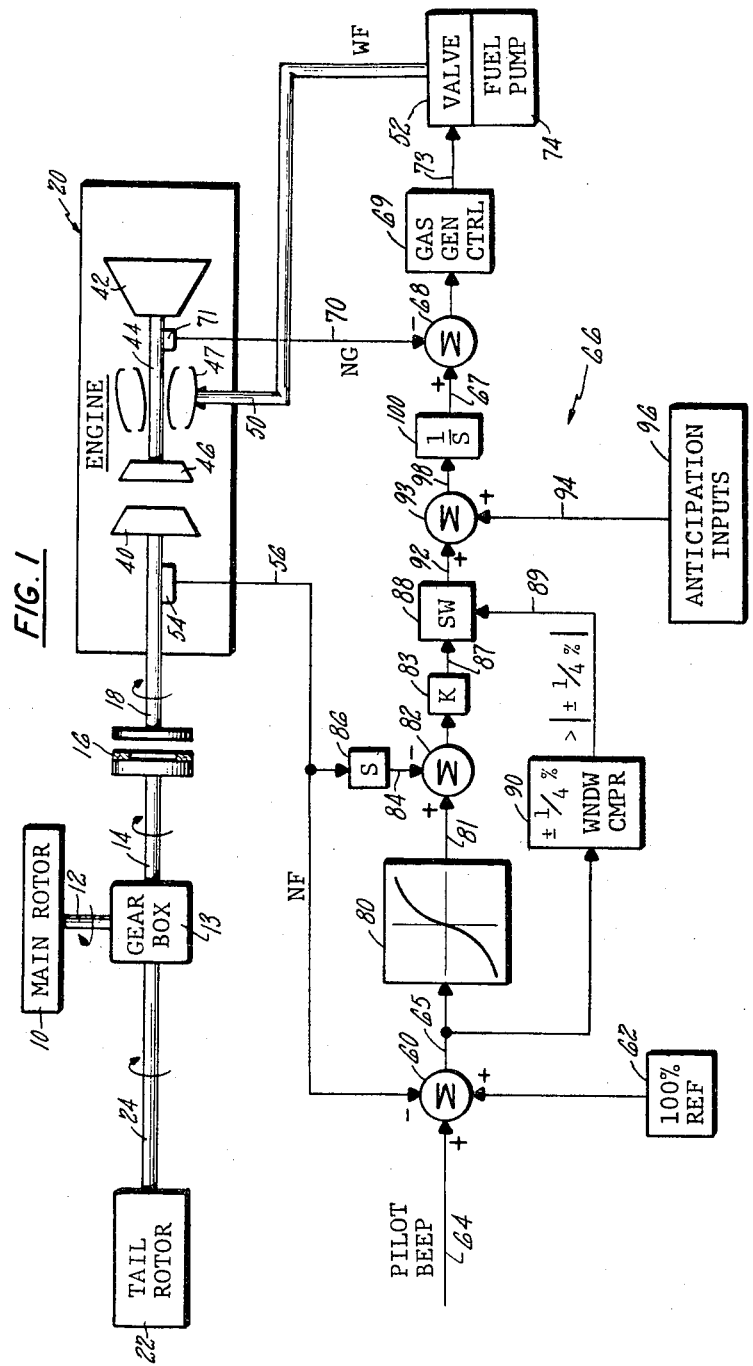

Referring now to FIG. 1, a main rotor 10 is connected through a shaft 12 to a gear box 13 which is driven by a shaft 14 through an overrunning clutch 16, which engages an output shaft 18 of an engine 20 when the engine speed equals or exceeds the rotor speed. The gear box 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine gas engine in which the output shafts 18 is driven by a free turbine 40, which is in turn driven by gases from a gas generator including a turbocompressor having a compressor 42 connected by a shaft 44 to a compressor-driving turbine 46, and a burner section 47 to which fuel is applied by fuel lines 50 from a fuel control metering valve 52. The fuel control typically tries to provide the correct rate of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. The other inputs to the summing junction 60 comprise the reference speed, which typically is a reference value indicative of 100% rated speed derived from a source 62 together with any pilot-desired variant therein as determined by a signal from the pilot's engine speed beeper on a line 64. The output of the summing junction 60 is a speed error signal on a line 65 which is applied to a turbine governor portion 66 of the fuel control, the output of which is a required gas generator speed signal on a line 67 which is fed to a summing junction 68 at the input of a gas generator control portion 69 of the fuel control. The summing junction 68 is also responsive to a signal indicative of gas generator speed (NG) on a line 70 which may be taken from a tachometer 71 responsive to the gas generator spool including the compressor 42, the shaft 44 and the turbine 46. The gas generator control 69 provides a commanded fuel rate on a line 73 which is applied to the metering valve 52 so as to cause the correct amount of fuel from a fuel pump 74 to be applied to the fuel inlet lines 50, as a function of the difference between the required and actual gas generator speed indications, in a well known fashion.

According to the invention, the turbine governor portion 66 of the fuel control operates in accordance with a wholly new principle. Specifically, the acceleration of the free turbine, rather than the speed is used to provide the required gas generator speed signal on the line 67. Specifically, the turbine speed error signal on the line 65 is applied to an amplifier 80, which preferably may be a variable gain amplifier in which smaller inputs are amplified by a larger gain than are larger inputs, of any well known type. This provides a desired turbine acceleration signal on a line 81 (bearing in mind that as used herein, the term acceleration includes deceleration as well). The desired turbine acceleration signal on the line 81 is applied to a summing junction 82 at the input of an amplifier 83, the other input of which on a line 84 is indicative of actual turbine acceleration, and is provided by a differentiator 86 which is responsive to the turbine speed signal on the line 56. The output of the amplifier 83 is a turbine acceleration error signal on a line 87. This is passed through a switch 88 (which may be an F.E.T. or other transistor switch) only when a signal is present on a line 89 indicating that the turbine speed error is in excess of ¼% of rated speed. Opening of the switch 88 when the turbine speed error is very small avoids integration of noise and minute speed errors, as described more fully hereinafter. The signal on the line 89 may be derived from a window comparator 90 which has reference voltages applied thereto indicative of +¼% of rated speed and −¼% of rated speed (or such other resolution as may be desired). If desired, the acceleration error signal output through the switch 88 on a line 92 may be applied to a summing junction 93 in which various anticipation inputs may be applied on a line 94 from suitable circuits 96 such as collective pitch anticipation of the type known to the prior art, or anticipation of an autorotating rotor reengaging with the engine as described in our copending U.S. patent application Ser. No. 369,300 filed Apr. 16, 1982 contemporaneously herewith and entitled HELICOPTER ENGINE CONTROL WITH ROTOR SPEED DECAY ANTICIPATOR. However, use of these anticipation inputs on a line 94 is irrelevant to the present invention. If such inputs are utilized, they may be in the form of desired turbine acceleration such that collective pitch gas generator speed scheduling need not be used. This is because the desired turbine acceleration signal is applied on a line 98 to an integrator 100 to convert it to a desired speed signal on the line 67.

The invention utilizes the speed error on the line 65 to generate a desired turbine acceleration signal for comparison with actual turbine acceleration, the acceleration error signal being integrated to provide the speed error signal on the line 67. By controlling fuel flow to achieve desired acceleration, rather than speed, overshoots are automatically eliminated (within the operating limits of the engine and the fuel control). And, because acceleration rather than speed is controlled, the gain can be sufficiently high to allow rapid recovery from droops. Although not referred to herein, the turbine speed signal on the line 56 may be filtered before application to the summing junction 60 or to the integrator 86 in order to eliminate noise therefrom and to ensure acceptable closed loop stability margins. If desired the function of the amplifier 80 can be rendered more sophisticated by applying suitable limits and/or gain changes in any given implementation of the invention when deemed desirable to suit the operating characteristics of the engine and helicopter within which a fuel control incorporating the present invention is to be used.

The invention is illustrated in an analog fashion. However, the signal processing functions involved are probably preferably performed in a digital computer, when one is available. Thus, in a digital fuel control, the signal processing functions of the invention would be performed by relatively simple programming steps which are analogous in an obvious fashion to the signal processing performed by the circuitry described herein. Or, a simple hydromechanical gas generator fuel control capable of receiving a desired gas generator speed signal on the line 67 could be employed on a helicopter having a digital automatic flight control system in which the processing of the engine speed signal to practice the present invention would be accomplished by simple programming steps performed within the automatic flight control computer. All of this is not germane to the present invention, it suffice that the invention may be practiced in any way in which the provision of a gas generator desired speed signal is provided as the integral of the difference between actual turbine acceleration and desired turbine acceleration provided as a function of turbine speed error is provided in any suitable way.

The invention is described with respect to a helicopter since control of overshoot in a free turbine engine is most critical in a helicopter due to the perturbations on helicopter trim which can result therefrom. However, the control of the present invention may be utilized on free turbines driving loads other than a helicopter rotor, if desired.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. An engine control for a free turbine gas engine, comprising:

speed means for providing an actual speed signal indicative of the speed of the free turbine;

fuel valve means responsive to a fuel command signal provided thereto for metering fuel to the engine; and fuel controlling signal processing means responsive to said speed means for providing a reference speed signal indicative of a desired speed of the turbine, for comparing said reference speed signal with said actual speed signal and providing a speed error signal indicative of the difference in said actual speed signal from said reference speed signal, and for providing a fuel command signal to said valve means in response to said speed error signal; characterized by:

said signal processing means comprising means for providing a desired acceleration signal as a function of said speed error signal, for providing, in response to said actual speed signal, an actual acceleration signal indicative of actual acceleration of the turbine, for providing, in response to said desired acceleration signal and said actual acceleration signal, an acceleration error signal indicative of the difference in said actual acceleration signal from said desired acceleration signal, and for providing said fuel command signal in response to said acceleration error signal.

2. An engine control according to claim 1 characterized by said signal processing means comprising means responsive to said speed error signal for providing a threshold signal indicative of said speed error signal being in excess of a predetermined threshold magnitude, and for providing said fuel command signal as an integral function of said acceleration error signal in the presence of said threshold signal.

* * * * *